United States Patent
Barth et al.

(10) Patent No.: US 7,735,837 B2
(45) Date of Patent: Jun. 15, 2010

(54) ACTIVE ANTI-ROLL DEVICE

(76) Inventors: Laurent Barth, 1 Rue Etiennette Buhler, Valdoie (FR) 90300; Xavier Delayre, 19 rue Carle Hebert, Courbevoie (FR) 92400

( * ) Notice: Subject to any disclaimer, the term of this patent is extended or adjusted under 35 U.S.C. 154(b) by 559 days.

(21) Appl. No.: 11/650,852

(22) Filed: Jan. 8, 2007

(65) Prior Publication Data
US 2007/0176375 A1 Aug. 2, 2007

(30) Foreign Application Priority Data
Jan. 19, 2006 (EP) .................. 06300044

(51) Int. Cl.
B60G 17/005 (2006.01)
(52) U.S. Cl. .................. 280/5.502
(58) Field of Classification Search .............. 280/5.501, 280/5.502, 5.504, 5.506, 5.507, 5.508, 124.106, 280/124.157, 124.161
See application file for complete search history.

(56) References Cited

U.S. PATENT DOCUMENTS

| | | | | |
|---|---|---|---|---|
| 3,002,765 | A * | 10/1961 | MacDuff | 280/5.503 |
| 4,613,153 | A * | 9/1986 | Shibahata et al. | 280/5.511 |
| 4,641,856 | A * | 2/1987 | Reichenbach | 280/5.511 |
| 4,834,419 | A * | 5/1989 | Kozaki et al. | 280/5.503 |
| 4,844,506 | A * | 7/1989 | Moriguchi et al. | 280/5.51 |
| 4,892,329 | A * | 1/1990 | Kozaki et al. | 280/5.511 |
| 4,973,077 | A * | 11/1990 | Kuwayama et al. | 280/124.107 |
| 5,882,017 | A * | 3/1999 | Carleer | 280/5.508 |
| 6,254,108 | B1 * | 7/2001 | Germain et al. | 280/5.506 |
| 6,669,208 | B1 | 12/2003 | Monk et al. | |
| 7,311,314 | B2 * | 12/2007 | Kasamatsu | 280/5.501 |
| 2005/0225048 | A1 * | 10/2005 | Kasamatsu | 280/124.16 |

FOREIGN PATENT DOCUMENTS

| | | |
|---|---|---|
| JP | 2003080917 A | 3/2003 |
| WO | 2004/08734 A1 | 3/2004 |

OTHER PUBLICATIONS

European Search Report—Apr. 21, 2006.

* cited by examiner

*Primary Examiner*—Ruth Ilan
*Assistant Examiner*—Robert A Coker
(74) *Attorney, Agent, or Firm*—Dickinson Wright PLLC

(57) ABSTRACT

Active anti-roll device to be fitted to a wheel set (4) of a motor vehicle (1), the said wheel set including two wheel supports (8b, 9b) coupled, with mobility in a so-called vertical direction (Z), to a frame (2) of the said vehicle, the said anti-roll device including a torsion bar (10) linked to the frame and the free ends of which are intended to be coupled respectively to the said wheel supports, characterised by the fact that it includes at least one actuator (13, 16) presenting a first zone connected to an eccentric point, relative to the median axis of the said vehicle, of the said torsion bar, by an actuator-bar linkage (14), and a second zone connected to the said frame by an actuator-frame linkage (15), the said at least one actuator presenting actuation means to create a relative displacement between the said first and second zones, the said at least one actuator being so arranged as to adjust a substantially vertical distance between the said eccentric point and the said frame as a function of a control signal, the said active anti-roll device including control means to transmit a control signal to the said at least one actuator.

16 Claims, 5 Drawing Sheets

ACTIVE ANTI-ROLL DEVICE

This Application claims priority to European Patent Application Number EP06300044 filed Jan. 19, 2006.

TECHNICAL FIELD

The object of the present invention is an active anti-roll device to be fitted to a wheel set of a motor vehicle.

BACKGROUND OF THE INVENTION

Active or passive anti-roll devices are generally used in vehicles to increase occupant comfort and the road-handling of the vehicle, notably on a bend.

The document EP 1 103 395 describes an active anti-roll device for a vehicle. The vehicle includes a pair of wheels rotating about an axle. The anti-roll device includes a torsion bar. In one embodiment, the anti-roll device includes an arm connected, on the one hand, to one end of the torsion bar and, on the other, to a damper associated with a wheel of the pair of wheels. The anti-roll device includes an hydraulic actuator, a piston rod of which is fixed to the other end of the torsion bar, and the casing of which is connected to a damper associated with the other wheel of the pair of wheels. The hydraulic actuator includes two fluid chambers separated by a piston fixed to the piston rod. The pressure in each of the two chambers is controlled by control means in such a way as to extend or compress the hydraulic actuator as a function of a predetermined condition of the vehicle.

The anti-roll device described in this document has the disadvantage that the vehicle must be fitted with an hydraulic circuit. A large amount of energy is used to control roll with such an anti-roll device. The present invention has the aim of proposing an active anti-roll device which avoids at least certain of the above-mentioned disadvantages and which permits effective control of the roll of a vehicle.

SUMMARY OF THE INVENTION

To this end, the invention has as its object an active anti-roll device to be fitted to a wheel set of a motor vehicle, the said wheel set including two wheel supports coupled, with mobility in a so-called vertical direction, to a frame of the said vehicle, the said anti-roll device including a torsion bar linked to the frame and the free ands of which are intended to be respectively coupled to the said wheel supports characterised by the fact that it includes at least one actuator presenting a first zone connected to a point eccentric, relative to the median axis of the said vehicle, of the said torsion bar, by an actuator-bar linkage, and a second zone connected to the said frame by an actuator-frame linkage, the said at least one actuator presenting actuation means to create a relative displacement between the said first and second zones, the said at least one actuator being arranged so as to adjust a substantially vertical distance between the said eccentric point and the said frame as a function of a control signal, the said active anti-roll device including control means to transmit a control signal to the said at least one actuator.

The actuator is so controlled as to increase the return torque applied by the torsion bar. The anti-roll device thus permits zeroing out, or at least limitation, of the angle of roll, for example in a bend. This ensures the safety of the vehicle and increases the comfort of the occupant or occupants of the vehicle.

In accordance with one embodiment of the invention, a said actuator includes hydraulic actuation means.

In accordance with one embodiment of the invention, a said actuator includes electrical actuation means.

In accordance with one embodiment of the invention, the said first zone of a said actuator is linked to the said second zone of the said actuator by a pivot linkage of axis parallel with a transversal direction of the said frame, the said first zone being so arranged that the axis of the said pivot linkage and the eccentric point of the torsion bar are in a substantially horizontal plane relative to the said frame, the said actuator including force reduction means coupled to the said actuation means and able to cause pivoting of the said first zone relative to the said second zone.

In accordance with a modification to this embodiment, the said force reduction means include a screw/nut reducer, the said actuation means being able to rotate the said screw about a longitudinal direction of the said frame, the said screw being able to drive the said nut in translation along the said longitudinal axis, the said nut and one of the said zones of the actuator being fixed one relative to the other, the said screw being linked to the other of the said zones of the actuator by a pivot linkage of axis parallel with a transversal direction of the said frame.

In accordance with another modification to this embodiment, the said force reduction means include a sector of circle and a worm screw, the said actuation means being able to rotate the said worm screw, the said worm screw being able to rotate the said sector of circle in the direction of the axis of the said pivot linkage, the said sector of circle and the said first zone being fixed one relative to the other.

In accordance with one embodiment of the invention, the said first zone of a said actuator is connected to the said second zone of the said actuator by a sliding linkage having an axis of slide orientated in the said vertical direction, the said actuator including force reduction means coupled to the said actuation means and able to cause translation in the so-called vertical direction of the said first zone relative to the said second zone.

In accordance with a modification to this embodiment, the said force reduction means include a rack and pinion, the said actuation means being able to turn the said pinion to drive the said rack in translation along the said slide axis of so-called vertical direction, the said rack and the said first zone being fixed one relative to the other.

In accordance with another modification to this embodiment, the said force reduction means include a screw/nut reducer, the said actuation means being able to rotate the said screw about an axis of so-called vertical direction, the said screw being able to drive the said nut in translation along the said axis of so-called vertical direction, the said nut and the said first zone of the actuator being fixed one relative to the other.

In accordance with one embodiment of the invention, the active anti-roll device includes two actuators connected, on the one hand, to the said frame and, on the other, to two respective eccentric points situated on either side of the centre of the said torsion bar.

Advantageously, the said control means are able to transmit two control signals to the said actuators respectively, in such a way that when a first of the said actuators increases the substantially vertical distance between the said eccentric point which is associated with it and the said frame, a second of the said actuators reduces the substantially vertical distance between the said eccentric point which is associated with it and the said frame.

Preferably, a first of the said actuators has a more rapid response time than a second of the said actuators.

Preferably, a first of the said actuators has a shorter stroke than a second of the said actuators.

In accordance with one embodiment of the invention, the actuator-bar linkage of one said actuator permits rotation of the first zone of the said first actuator relative to the said torsion bar about an axis of the said torsion bar.

In accordance with one embodiment of the invention, the actuator-bar linkage of the said actuator permits rotation of the first zone of the said first actuator relative to the said torsion bar about a longitudinal direction of the said vehicle.

In accordance with one embodiment of the invention, the actuator-bar linkage of the said actuator permits translation of the said first zone of the said actuator relative to the said torsion bar along the said axis.

In accordance with one embodiment of the invention, the said second zone of a said actuator is fixed relative to the said frame.

In accordance with one embodiment of the invention, the said at least one actuator includes two first zones connected to two eccentric points of the said torsion bar, situated on either side of the centre of the said torsion bar, by two actuator-bar linkages, the said at least one actuator being able to adjust a substantially vertical distance between each of the said eccentric points and the said frame as a function of the said control signal.

In accordance with a modification to this embodiment, at least one of the said actuator-bar linkages permits translation of the said torsion bar relative to the said corresponding first zone in a transversal direction of the said frame, the said at least one actuator including force reduction means including a screw/nut reducer, the said actuation means being able to rotate the said screw about a transversal direction of the said frame, the said screw being able to drive the said nut in translation in the said transversal direction, the said nut being linked by a pivot linkage of axis parallel with a longitudinal direction of the said frame to a third zone of the said at least [one] actuator, the said third zone being so linked to the said two first zones that, when one of the said first zones effects a displacement relative to the said frame in a direction of displacement, the other of the said first zones effects a displacement relative to the frame in a direction opposite to the direction of displacement.

The invention will be better understood and other aims, details, characteristics and advantages of it will become more clearly apparent in the course of the following detailed explanatory description of several embodiments of the invention given as purely illustrative and non-limiting examples, with reference to the attached diagrammatic drawings.

DESCRIPTION OF THE PREFERRED EMBODIMENT

Figure 1:
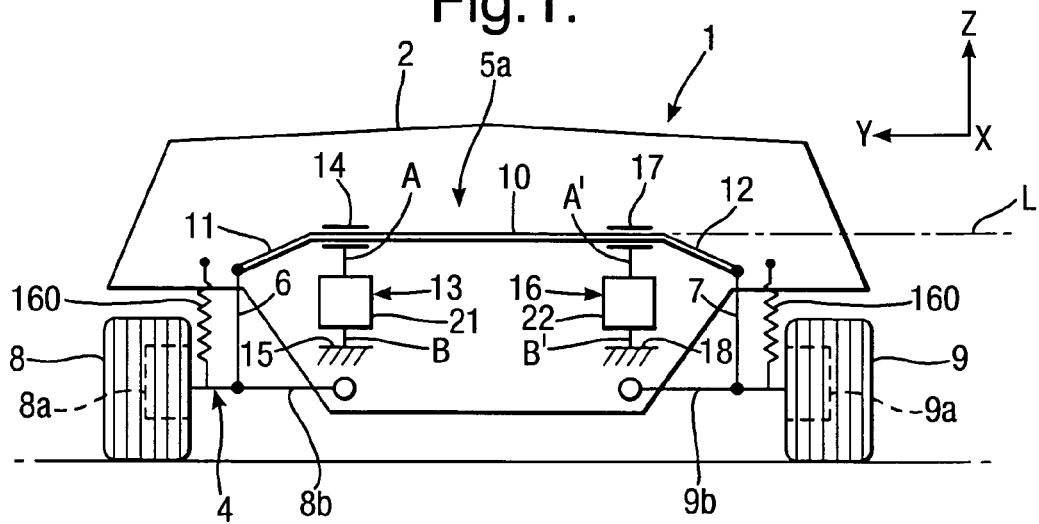
FIG. 1 is a simplified diagrammatic view of the rear of a vehicle including an active anti-roll device in accordance with a first embodiment of the invention.
Figure 2:
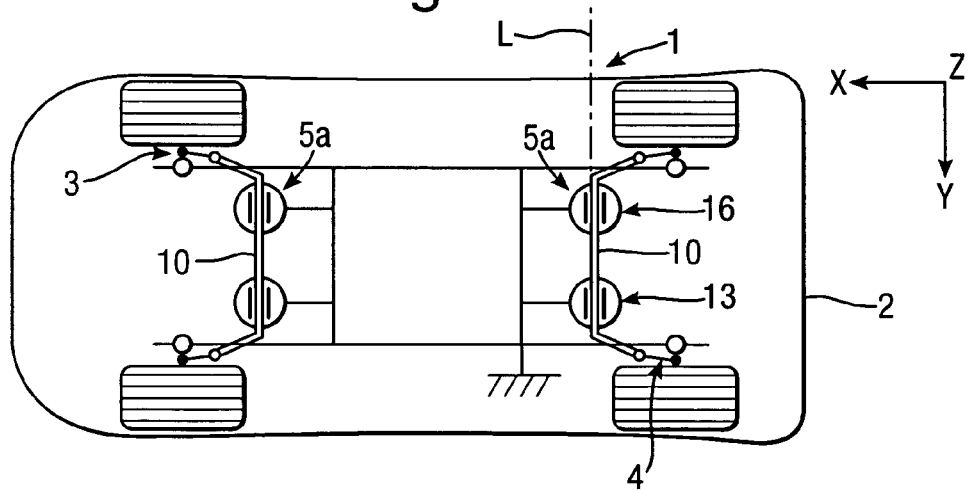
FIG. 2 is a simplified diagrammatic view from above of the vehicle of FIG. 1.

With reference to FIGS. 1 and 2, these show a vehicle 1 including a frame 2, a front wheel set 3, a rear wheel set 4 and an active anti-roll device 5a in accordance with a first embodiment of the invention. The frame 2, also called the bodywork, is the suspended mass of the vehicle 1, which rests on struts 160.

A more detailed description will now be given of the rear wheel set 4 and the elements of the active anti-roll device 5a associated with the rear wheel set 4, the elements of the front wheel set 3 and the elements of the active anti-roll device 5a associated with the front wheel set 3 formed in a similar manner bear the same reference numbers and will not be described in detail.

The wheel set 4 includes two wheels 8 and 9 mounted on hub carriers 8a and 9a coupled to the frame 2 with vertical mobility, i.e. with mobility in the vertical direction Z, each hub carrier 8a, 9a being fixed to the end of a suspension arm 8b and 9b respectively. The vertical direction Z is here defined as the vertical direction relative to the vehicle 1. In a similar manner, the longitudinal direction X designates the longitudinal direction of the vehicle 1 and the transversal direction Y designates the transversal direction of the vehicle 1.

The anti-roll device 5a includes a torsion bar 10. The torsion bar 10 is substantially U-shaped. The free end of each lateral portion 11 and 12 of the torsion bar 10 is coupled to one of the suspension arms 8b and 9b by a connecting rod 6 and 7 respectively. For example, the bar 10 has a relatively low torsion stiffness relative to the axis L of the central portion of the bar 10, of direction Y. This improves comfort.

The anti-roll device 5a includes an actuator 13 coupled, at a point A, to an eccentric point of the torsion bar 10, by a linkage 14, and at a point B to the frame 2 of the vehicle 1, by a linkage 15. The actuator 13 includes a casing 21, for example of substantially cylindrical form.

The anti-roll device 5a includes an actuator 16 coupled, at a point A', to an eccentric point of the torsion bar 10, by a linkage 17, and, at a point B', to the frame 2 of the vehicle 1, by a linkage 18. The point A' is for example the point symmetrical to point A relative to the centre of the torsion bar 10. The actuator includes a casing 22, for example of substantially cylindrical form.

The actuator 13 (the actuator 16 respectively) includes two zones mobile one relative to the other in the vertical direction Z and actuation means to displace the two zones one relative to the other so as to adjust a vertical distance between the points A and B (the points A' and B' respectively). The actuation means, which will be described in detail below, are for example electrical. Electrical actuation means can for example comprise a direct current rotary motor with a mechanical commutator, a synchronous rotary motor with a permanent magnet, an asynchronous rotary motor, a rotary stepped motor, or a synchronous electromagnetic linear motor with a permanent magnet.

The actuators 13, 16 are connected to control means (not shown) able to receive data from sensors (not shown) or systems (not shown) of the vehicle 1 and to transmit control signals to the actuators 13, 16 to adjust the distance between the points A and B and the points A' and B' as a function of the data from the sensors and systems. The sensors comprise, for example, a lateral acceleration sensor, a steering-wheel angle sensor, a vehicle velocity sensor, a longitudinal acceleration sensor, a yaw sensor, a force sensor placed on one of the two connecting rods 6 or 7 or on each actuator 13, 16. The control means may be connected and use data from other control systems of the vehicle, for example an ABS system (Anti lock Brake System) and an ESP system (Electronic Stability Program).

Figure 3:
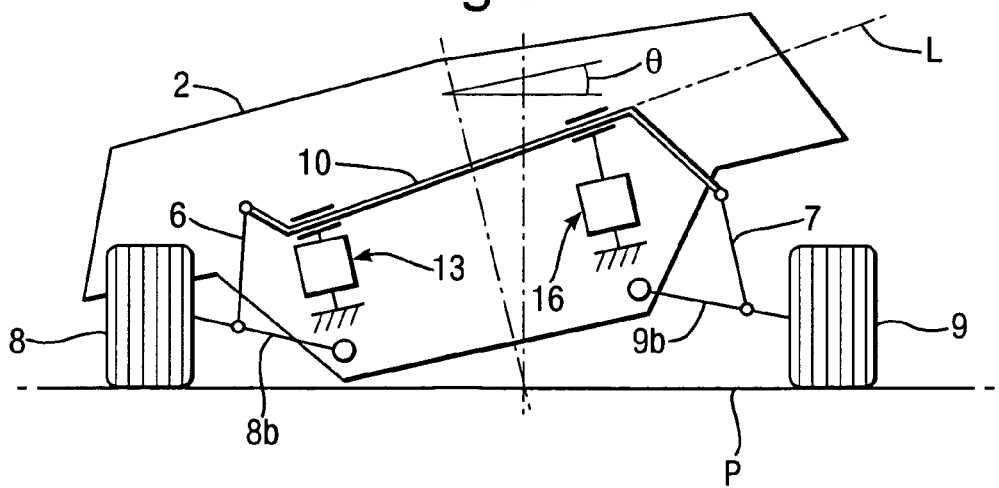
FIG. 3 is a view similar to FIG. 1, the vehicle taking a bend to the right.

FIG. 3 shows the vehicle 1 in a bend to the right. In this case, the frame 2 of the vehicle 1 is inclined, due to the lateral acceleration, by an angle of roll θ relative to the plane of the road, called the horizontal plane P, towards the outside of the bend. The effect of this is that the right wheel 9 applies a downwardly directed force to the torsion bar 10 and that the left wheel 8 applies an upwardly directed force to the torsion bar 10.

In this position, the torsion bar 10 is deformed and tends to elastically re-adopt its rest position, returning the frame 2 towards its initial position, or rest position (FIG. 1), relative to the wheels 8, 9.

Simultaneously, the control means instruct a reduction in the distance between the points A and B. In this case, the torsion bar 10 applies a downwardly directed force to the wheel support 6, which has the effect of distancing the wheel 8 from the frame 2, i.e. returning the frame 2 towards its initial position (FIG. 1).

Simultaneously, the control means instruct an increase in the distance between the points A' and B'. In this case, the torsion bar 10 applies an upwardly directed force to the wheel support 7, which has the effect of bringing the wheel 9 closer to the frame 2, i.e. returning the frame 2 towards its initial position (FIG. 1).

In other words, the actuators 13 and 16 are so controlled as to increase the return torque applied by the torsion bar 10. The anti-roll device 5*a* therefore permits zeroing out, or at least limitation, of the angle θ of the frame 2 relative to the horizontal plane P in a bend. In this way, the safety of the vehicle 1 is ensured and comfort is increased for the occupant or occupants of the vehicle.

Figure 4:
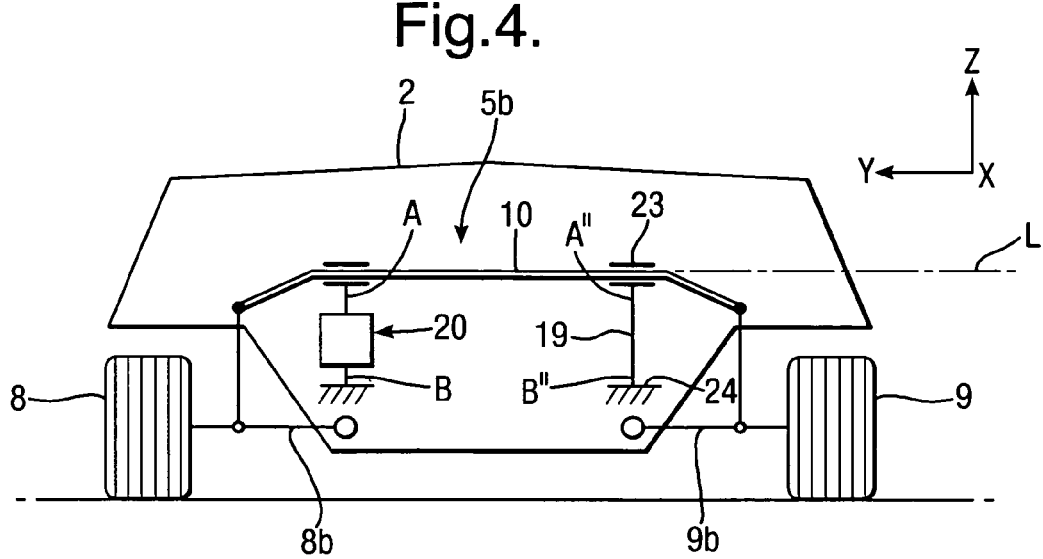
FIG. 4 is a view similar to FIG. 1, the vehicle including an active anti-roll device in accordance with a second embodiment of the invention.
Figure 5:
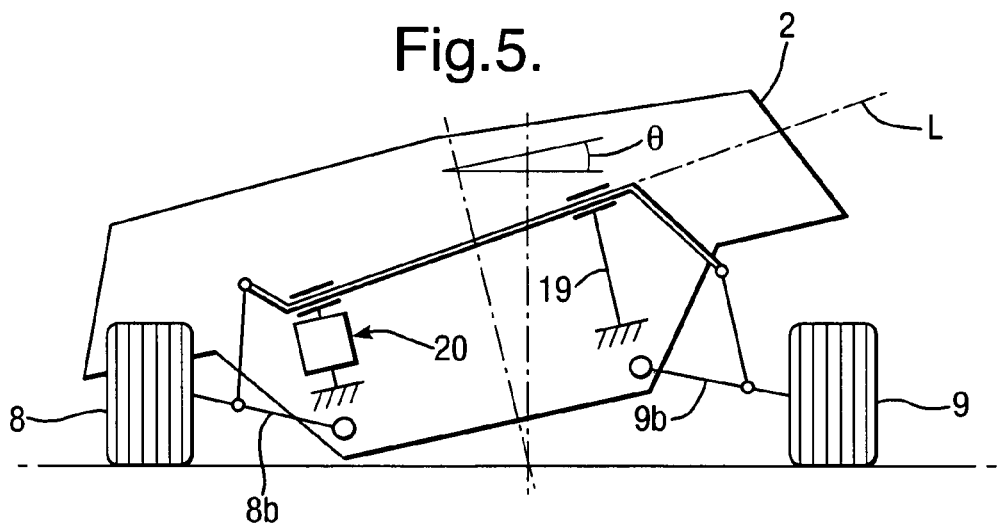
FIG. 5 is a view similar to FIG. 3 for the second embodiment of the invention.

With reference to FIGS. 4 and 5, these show an anti-roll device 5*b* in accordance with a second embodiment. The elements of the anti-roll device 5*b* identical to the first embodiment are designated by the same reference number and are not described again. Here, the anti-roll device 5*b* includes a single actuator 20, which is for example similar to the actuator 13. The anti-roll device 5*b* includes connecting means 19, coupled at a point A" to an eccentric point of the torsion bar 10, by a linkage 23 which is for example similar to the linkage 17, and at a point B" to the frame 2 of the vehicle 1, by a linkage 24 which is for example similar to the linkage 18. The point A" is for example the point symmetrical with the point A relative to the centre of the torsion bar 10. The distance between the point A" and the point B" is fixed. The operation of the anti-roll device 5*b* is similar to the operation of the anti-roll device 5*a*, only the distance between the points A and B being adjustable.

The linkages 14, 15, 17 and 18 (linkages 14, 15, 23 and 24 respectively) will now be described in more detail. Adjustment of the distances between the points A and B and A' and B' (A and B and A" and B" respectively) requires that the bar 10 be able to be inclined relative to the longitudinal direction X. The bar 10 must therefore be able to rotate about the direction X relative to at least certain of the linkages 14, 15, 17 and 18 (linkages 14, 15, 23 and 24 respectively). The bar 10 must also be able to be deformed by torsion about the axis L, which requires that the bar 10 is able to rotate about the axis L relative to at least certain of the linkages 14, 15, 17 and 18 (linkages 14, 15, 23 and 24 respectively). Table 1 shows combinations of degrees of freedom of the linkages 14, 15, 17 and 18 (linkages 14, 15, 23 and 24 respectively) which permit implementation of the first embodiment (second embodiment respectively).

FIGS. 6 to 12 show example embodiments of the linkages 14 and 17 which allow the degrees of freedom of table 1 to be obtained.

Figure 6:
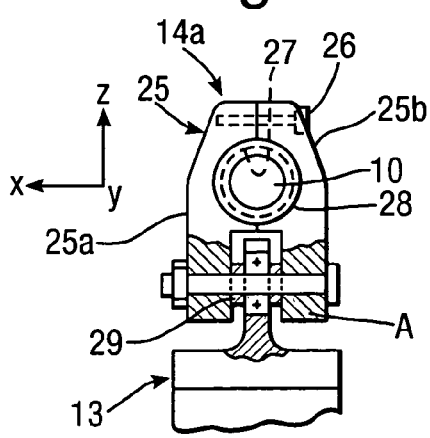
FIGS. 6 to 12 are simplified diagrammatic views showing example embodiments of an actuator-bar linkage and an actuator-frame linkage.
Figure 7:
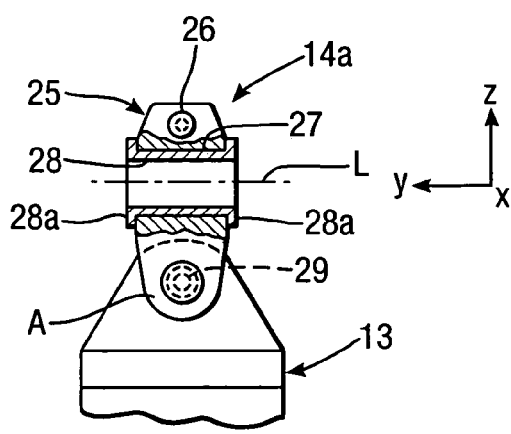

With reference to FIGS. 6 and 7, the linkage 14*a* includes a cover 25 comprising two parts 25*a* and 25*b* fixed together by a screw 26. The cover 25 includes a through opening 27 of circular section in which a plastics sleeve 28 is clasped. The sleeve 28 has flanges 28*a* permitting prevention of movement of the sleeve 28 relative to the cover 25 along the axis L. The bar 10 is inserted in the sleeve 28. The cover 25 is coupled at the point A to the actuator 13 by a ball bearing 29 of axis parallel with the direction X. The linkage 14*a* permits rotation about the direction X and rotation about the axis L of the bar 10 relative to the point A. The linkage 14*a* may or may not allow translation of the bar 10 relative to the point A in the direction of the axis L.

Figure 8:
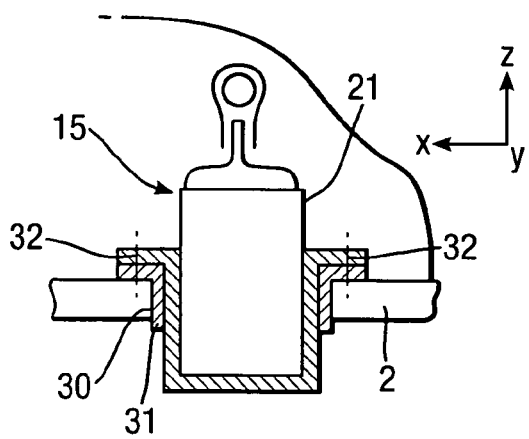

With reference to FIG. 8, the linkage 15 includes a cylindrical insert 30 which is inserted in a cradle 31 of the frame 2 of the vehicle. The casing 21 is inserted in the insert 30 and fixed to it by screws 32. The linkage 15 corresponds to embedded fitting of the actuator 13 in the frame 2.

Figure 9:
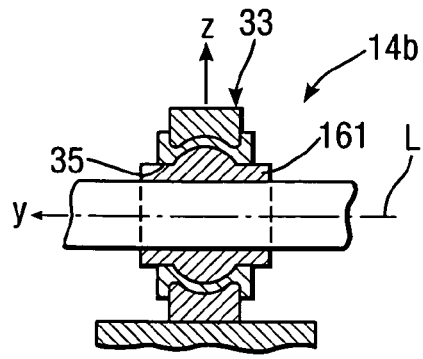
Figure 10:
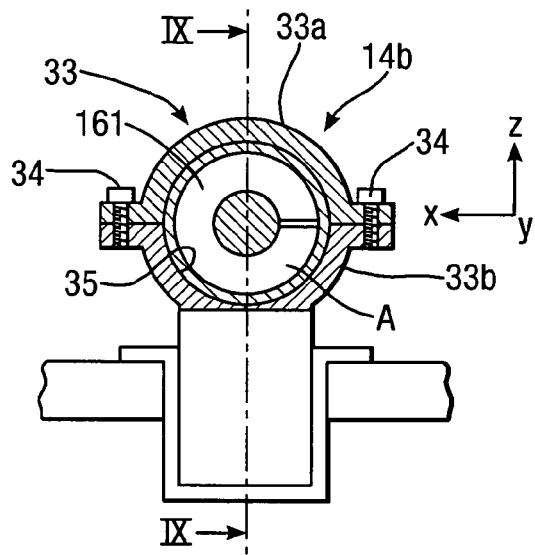
Figure 10A:
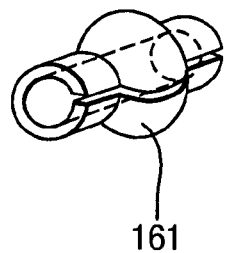

With reference to FIGS. 9, 10 and 10A, the linkage 14*b* includes a plastics swivel joint 33 comprising two parts 33*a* and 33*b* fixed together by screws 34. The bar 10 is inserted in a split piece 161 of circular section swiveling in a piece 35. The piece 35 is clasped and covered by the parts 33*a* and 33*b*. The swivel joint 33 is fixed to the actuator 13 at point A. The linkage 14*b* permits rotation about the directions X and Y of the bar 10 relative to the point A. The linkage 14*b* may or may not allow translation of the bar 10 relative to the point A in the direction of the axis L. The casing 21 is embedded in the frame in a similar manner to that described with reference to FIG. 8.

Figure 11:
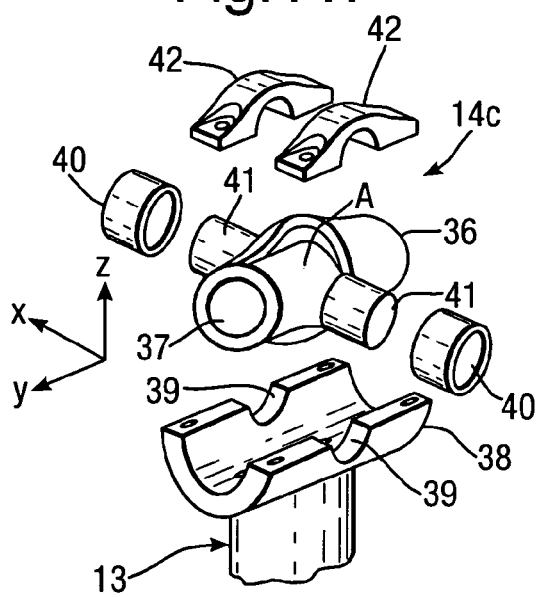

With reference to FIG. 11, the linkage 14*c* includes a cover 36 with an orifice 37 of circular section for insertion of the bar 10. The linkage 14*c* includes a cover support 38, fixed to the actuator 13. The cover support 38 has the form of a cradle and includes on each of its lateral walls an opening 39 of semi-cylindrical form, the openings 39 being opposite each other. Drawn cup needle bearings 40 are inserted in the openings 39 respectively. The drawn cup needle bearings 40 co-operate with protuberances 41 from the cover 36. Fixing elements 42, which are for example screwed onto the cover support 38 after location of the drawn cup needle bearings 40 on the cover 36 and of the cover 36 on the cover support 38, hold the drawn cup needle bearings 40 in position relative to the protuberances 41 and the openings 39. The linkage 14*c* permits rotation of the bar 10 relative to the point A about the direction X and about the axis L. The linkage 14*c* may or may not allow translation of the bar 10 relative to the point A along the axis L.

Figure 12:
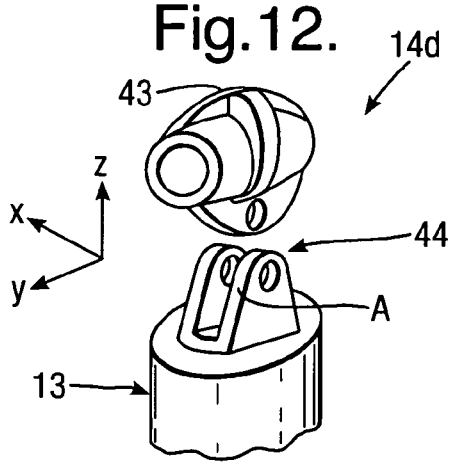

With reference to FIG. 12, the linkage 14*d* includes a cover 43 in which the bar 10 is intended to be inserted. The cover 43 is coupled to the actuator 13, at the point A, by a pivot linkage 44 of axis parallel with the direction X, which is formed by a bearing or drawn cup needle bearing.

The linkage 14 is thus formed for example by one of the linkages 14*a* to 14*d*. The linkages 17 and 23 may be similar to the linkage 14, i.e. the linkages 17 and 23 may be formed of one of the linkages 14*a* to 14*d*. The linkages 18 and 24 are for example formed in a similar manner to the linkage 15. It will be noted that the linkage 15 is not necessarily formed by an embedded fitting. In particular, when the linkage 15 must allow rotation of the actuator 13 relative to the frame 2 about the direction X, a pivot linkage may be inserted between the frame 2 and the point B.

Other alternatives are possible, for example the linkages 14 and 17 can be formed by a single elastic element of silent bloc type fixed to the actuator 13, 16 respectively and in which the bar 10 can slide and rotate about the axis L.

With reference to FIGS. 13 to 16, several possible embodiments of the actuator 13 will now be described, in which the actuator 13 includes a rotary motor 68 and transmission elements. The reduction ratio may be constant or variable.

Figure 13:
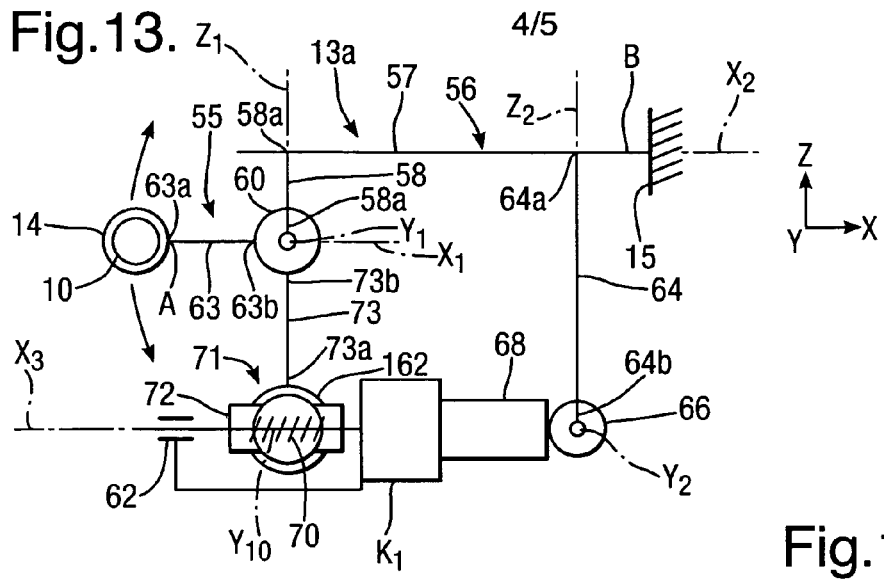
FIGS. 13 to 16 are functional kinematic diagrams showing example embodiments of an active anti-roll device actuator.

FIG. 13 shows a first embodiment of the actuator 13.

In this embodiment, a first zone 55 of the actuator 13a is coupled, at point A, to the torsion bar 10 by the linkage 14. The linkage 14 is formed for example in accordance with one of the embodiments described above with reference to FIGS. 6 to 12. The point A is situated at one end 63a of an arm 63 of the first zone 55, arranged along an axis X1 of direction X. The opposite end 63b of the arm 63 is coupled to one end 58a of an arm 58 of a second zone 56 of the actuator 13a by a pivot linkage 60 of axis Y1 of direction Y. The arm 58 is arranged along an axis Z1 of direction Z. The opposite end 58a of the arm 58 is fixed to an arm 57 of the second zone 56, arranged along an axis X2 of direction X.

The arm 57 is coupled, at point B, to the frame 2, by the linkage 15, which is for example an embedded fitting.

The arm 57 is fixed to one end 64a of an arm 64 of the second zone 56 arranged along an axis Z2 of direction Z, the axis Z2 being distinct from the axis Z1. The opposite end 64b of the arm 64 is coupled to the rotary motor 68 by a pivot linkage 66 of axis Y2 of direction Y, which is for example formed by a plain bearing. The axis Y2 is distinct from the axis Y1. The motor 68 is so arranged that its rotor is able to rotate about an axis X3 of direction X. The rotor of the motor 68 is connected to a first part 70 of a ball screw 71, arranged along the axis X3.

The first part 70 of the ball screw 71 is coupled to the stator of the motor by a pivot linkage 62 of axis X3. The pivot linkage 62 allows the first part 70 of the ball screw 71 to be held in position, in particular when the first part 70 of the ball screw 71 is rotated by the motor 68. A second part 72 of the ball screw 71 is coupled to the first part 70 of the ball screw 71, in such a manner that rotation of the first part 70 causes translation along the axis X3 of the second part 72 relative to the first part 70. The second part 72, also called a nut, is coupled to one end 73a of an arm 73, arranged along the axis Z1, by a pivot linkage 162 of axis Y10, which is for example formed of two ball bearings positioned on either side of the ball screw 70. The opposite end 73b of the arm 73 is coupled to the end 58a of the arm 58 by the pivot linkage 60. In other words, the arm 73 is fixed relative to the arm 63 and the first zone 55 is therefore formed of an L, having its angle at the pivot linkage 60.

The fixings of the arms 63, 58, 57, 64 and 73 are for example formed by welds. The loads to be supported being high, the arms 63, 58, 57, 64 and 73 are for example made of steel or aluminium.

The parts 14, 63, 60, 73 and 72 form an assembly, called a rocker, moveable relative to the frame. The rocker may for example be formed by a welded mechanical piece or by a moulded piece.

The parts 58, 57 and 64 form an assembly, called a base, fixed relative to the frame.

The operation of the actuator 13a will now be described.

When the rotor of the motor 68 rotates about axis X3, this has the effect of causing rotation about the axis X3 of the first part 70 of the ball screw 71. The transmission ratio is equal to:

$$\frac{\Omega m}{Vl} = k1 \frac{2\pi}{sl} rlr$$

in which sl is the pitch of the screw 71, rlr is the ratio of the arm of the lever formed by the arms 73 and 63, k1 is the ratio of the transmission between the motor 68 and the screw 70, $\Omega m$, the angular velocity of the motor and Vl the velocity of the actuator.

Rotation of the first part 70 has the effect of causing translation along the axis X3 of the second part 72 relative to the first part 70. The second part 72 applies to the arm 73 a force directed along the axis X3. This has the effect of simultaneously causing rotation about the axis Y2 of the motor 68 relative to the arm 64 and rotation about the axis Y1 of the arm 73, and therefore of arm 63, relative to the arm 58. The first zone 55 thus performs a vertical movement relative to the second zone 56, which allows the distance between the points A and B to be adjusted.

Figure 14:
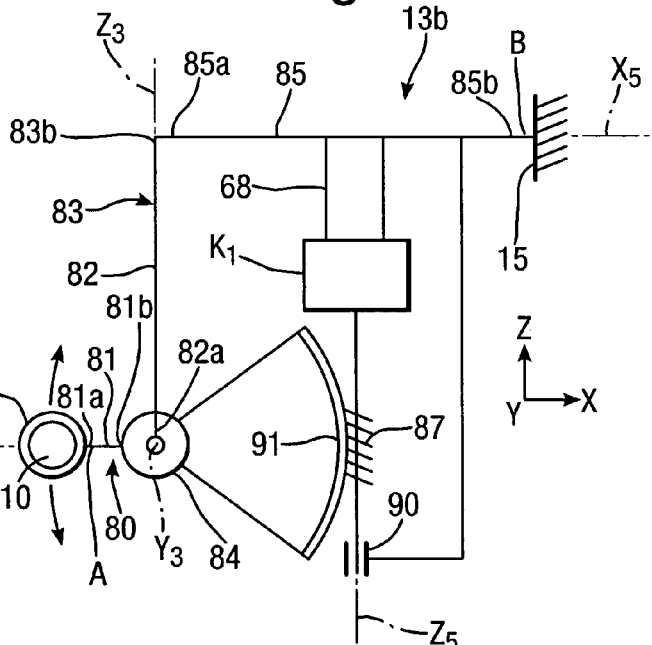

FIG. 14 shows a second embodiment of the actuator 13.

In this embodiment, a first zone 80 of the actuator 13b is coupled, at the point A, to the torsion bar 10, by the linkage 14. The linkage 14 is constructed in accordance with one of the embodiments described above with reference to FIGS. 6 to 12. The point A is situated at one end 81a of an arm 81 of the first zone 80, arranged along an axis X4 of direction X. The opposite end 81b of the arm 81 is coupled to one end 82a of an arm 82 of a second zone 83 of the actuator 13b by a pivot linkage 84 of axis Y3 of direction Y. The arm 82 is arranged along an axis Z3 of direction Z. The opposite end 83b of the arm 83 is fixed to one end 85a of an arm 85 of the second zone 83. The arm 85 is arranged along an axis X5 of direction X. The opposite end 85b of the arm 85 is coupled to the frame 2 at the point B, by linkage 15, which is for example an embedded fitting.

The motor 68 is fixed to the arm 85. The motor 68 is so arranged that its rotor can rotate about an axis Z5 of direction Z. The rotor of the motor 68 is coupled to a worm screw 87. The worm screw 87 is arranged along the axis Z5. The worm screw 87 is coupled to the arm 85 by a pivot linkage 90 of axis Z5. The pivot linkage 90 allows the worm screw 87 to be held in position, in particular when the worm screw 87 is rotated by the motor 68.

A toothed sector of circle 91 is engaged in the worm screw 87. The centre of the angular sector 91 is coupled to the arm 82 by the pivot linkage 84. In other words, the sector of circle 91 is fixed relative to the arm 81.

The operation of the actuator 13b will now be described.

When the rotor of the motor 68 rotates about the axis Z5, this has the effect of causing a rotation about the axis Z5 of the worm screw 87. The transmission ratio is equal to:

$$\frac{\Omega m}{Vl} = k1 \frac{Zb}{Za} \frac{1}{Rb}$$

in which Za is the number of threads of the screw 87, Zb is the number of teeth of a toothed wheel of the same primitive radius as the angular sector 91, Rb is the distance between the pivot linkage 84 and the bar 10, k1 is the ratio of the transmission between the motor 68 and the screw 87, Ωm the angular velocity of the motor 68 and Vl the velocity of the actuator 13b.

Rotation of the worm screw 87 has the effect of rotation about the axis Y3 of the angular sector 91 relative to the arm 82, and therefore rotation about the axis Y3 of the arm 81 relative to the arm 82. The first zone 80 thus performs a vertical movement relative to the second zone 83, which allows adjustment of the distance in the direction Z between the points A and B.

Figure 15:
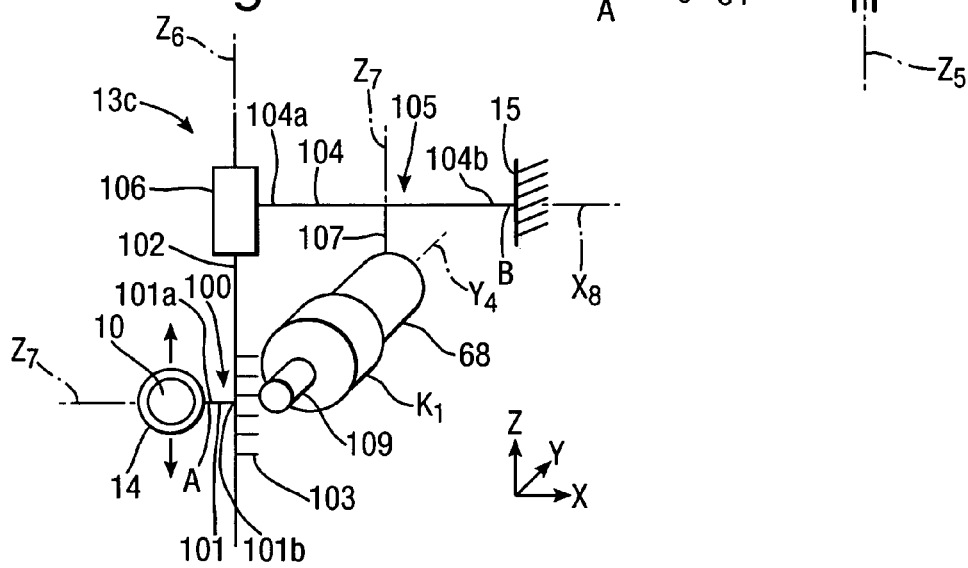

FIG. 15 shows a third embodiment of the actuator 13.

In this embodiment, a first zone 100 of the actuator 13c is coupled, at point A, to the torsion bar 10, by the linkage 14. The linkage 14 is formed in accordance with one of the embodiments described above with reference to FIGS. 6 to 12. The point A is situated at one end 101a of an arm 101 of the first zone 100, arranged along an axis X7 of direction X. The opposite end 101b of the arm 101 is fixed to an arm 102 including a rack 103. The arm 102 is arranged along an axis Z6 of direction Z. The arm 102 is coupled to one end 104a of an arm 104 of a second zone 105 of the actuator 13c by a sliding linkage 106 of axis Z6, which is for example formed of a ball bearing slide. The arm 104 is arranged along an axis X8 of direction X. The opposite end 104b of the arm 104 is coupled, at the point B, to the frame 2, by the linkage 15, which is for example an embedded fitting. The arm 104 is fixed to an arm 107 arranged along an axis Z7 of direction Z. The arm 107 is fixed to the motor 68. The motor 68 is so arranged that its rotor can rotate about an axis Y4 of direction Y. The rotor of the motor 68 is fixed to a pinion 109 engaged in the rack 103.

The operation of the actuator 13c will now be described.

When the rotor of the motor 68 rotates about axis Y4, this has the effect of causing rotation about the axis Y4 of the pinion 109. The transmission ratio is equal to:

$$\frac{\Omega m}{Vl} = k1 * k2$$

in which k1 is the transmission ratio between the motor 68 and the pinion 109 and k2 is the ratio of the rack and pinion system in millimeters per revolution.

Rotation of the pinion 109 has the effect of translation along the axis Z6 of the rack 103, and therefore of the arm 101, relative to the arm 104. The first zone 100 thus performs a vertical movement relative to the second zone 105, which allows the distance between the points A and B to be adjusted.

Figure 16:
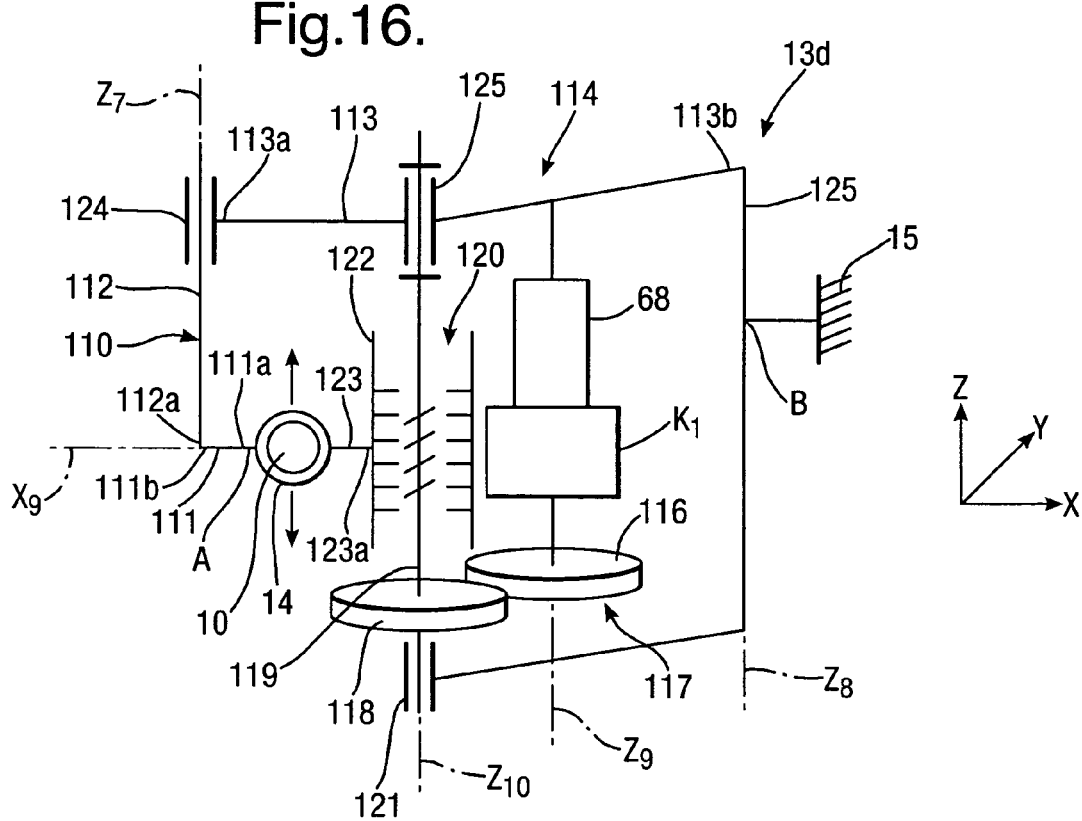

FIG. 16 shows a fourth embodiment of the actuator 13.

In this embodiment, a first zone 110 of the actuator 13d is coupled, at point A, to the torsion bar 10 by the linkage 14. The linkage 14 is formed in accordance with one of the embodiments described above with reference to FIGS. 6 to 12. The point A is situated at one end 11a of an arm 111 of the first zone 110, arranged along an axis X9 of direction X. The opposite end 111b of the arm 111 is fixed to one end 112a of an arm 112 arranged along an axis Z7 of direction Z. The arm 112 is coupled by a slide linkage 124 of axis Z7, which is for example formed by a ball bearing, to one end 113a of an arm 113 of a second zone 114 of the actuator 13d. The opposite end 113b of the arm 113 is fixed to an arm 125 arranged along an axis Z8 of direction Z. The arm 125 is coupled, at point B, to the frame 2, by the linkage 15, which is for example an embedded fitting.

The rotary motor 68 is so fixed to the arm 113 that its rotor is able to rotate about an axis Z9 of direction Z. The rotor of the motor 68 is fixed to the centre of a toothed disc 116 of a gear system 117 arranged in a substantially horizontal plane. The toothed disc 116 is engaged in a toothed disc 118 of the gear system 117. The centre of the toothed disc 118 is fixed to a first part 119 of a ball screw 120, arranged along an axis Z10 of direction Z. The first part 119 is coupled to the arm 125 by a pivot linkage 121 of axis Z10. The pivot linkage 121 allows the first part 119 to be held in position, in particular when the first part 119 is rotated by the motor 68. The first part 119 is coupled to the arm 113 by a pivot linkage 125 of axis Z10, which is for example formed of a drawn cup needle bearing.

A second part 122 of the ball screw 120 is so coupled to the first part 119 of the ball screw 120 that rotation of the first part 119 causes translation along the axis Z10 of the second part 122 relative to the first part 119. The second part 122 is fixed to one end 123a of an arm 123 arranged along the axis X9. The arm 123 is fixed relative to the arm 111.

The operation of the actuator 13d will now be described.

When the rotor of the motor 68 rotates about axis Z9, this has the effect of causing rotation of the disc 116 about the axis Z9. The transmission ratio is equal to:

$$\frac{\Omega m}{Vl} = k1 \frac{2\pi}{sl}$$

in which sl is the pitch of the screw 120, k1 is the ratio of the transmission between the motor 68 and the first part of the screw 120, Ωm is the angular velocity of the motor and VL is the velocity of the actuator 13d.

Rotation of the disc 116 causes rotation about the axis Z10 of the disc 118. Rotation of the disc 118 causes rotation of the first part 119 about the axis Z10. Rotation of the first part 119 causes translation along the axis Z10 of the second part 122 relative to the first part 119. The translation of the second part 122 causes translation in the direction Z of the arm 123 relative to the arm 113. The first zone 110 thus performs a vertical movement relative to the second zone 114, which permits adjustment of the distance between the points A and B.

The actuator 13 is thus formed in accordance with one of the embodiments 13a to 13d. The actuators 16 and 20 can also be formed in accordance with one of the embodiments 13a to 13d. It will be noted that, in the first embodiment, the actuator 13 is not necessarily identical to the actuator 16.

An example of the actuator 13a will now be described. The motor is a brushless synchronous motor. The maximum torque is 1.1 Nm. It will be noted that the torque depends on the mass of the vehicle and the type of dynamics of the system (sports, . . . ). The maximum velocity without load is 3800 revolutions per minute. The ratio of the lever arm rlr is equal to 2, the pitch of the screw sl is equal to 3.5 mm per revolution and the ratio k1 is equal to 2.68.

The mass of the vehicle is less than or equal to 2020 kg. The distance from the centre of gravity to the roll axis is equal to 650 mm. The lateral acceleration is less than or equal to 1 g.

The angle of roll is 2.5 degrees. The torsion stiffness of the torsion bar is 720 Nm/degree.

The load of the actuator 13a is +/−6550 N. The displacement of the actuator 13a is +/−5.4 mm. The maximum power of the actuator 13a is 540 W.

Figure 17:
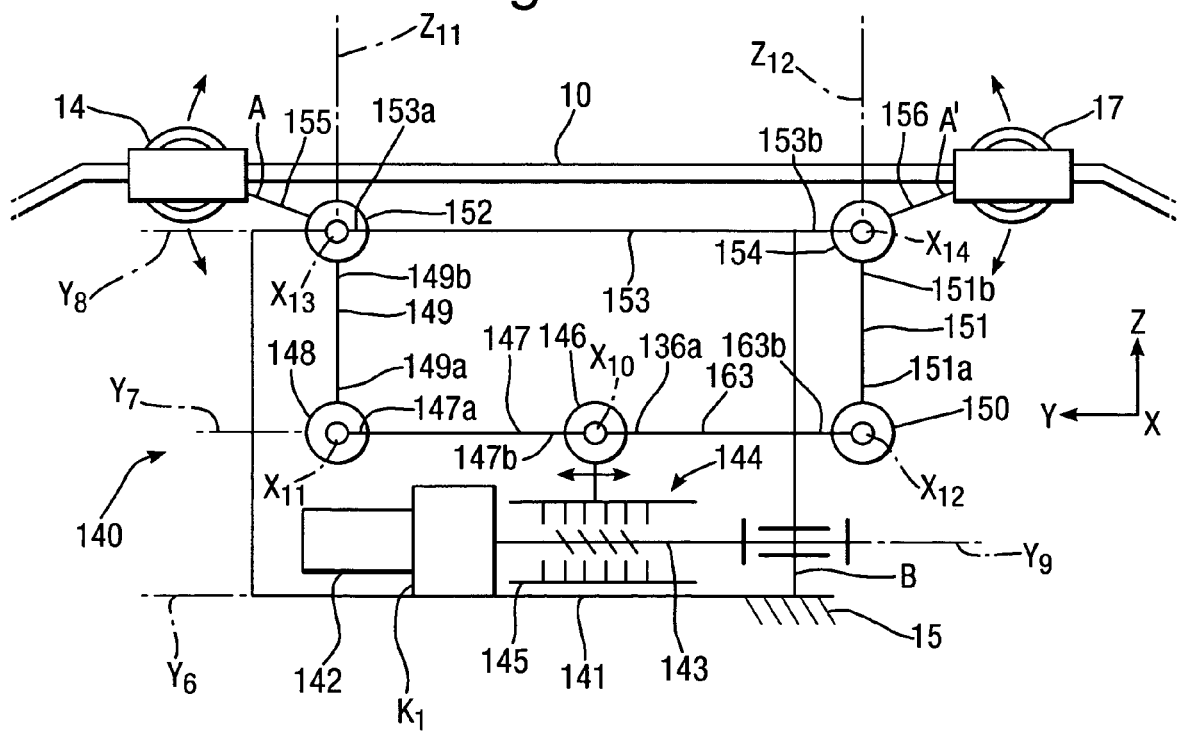
FIG. 17 is a functional kinematic diagram showing a third embodiment of the active anti-roll device.

Referring to FIG. 17, a third embodiment shows an actuator 140 coupled at a point A to an eccentric point of the bar 10 by linkage 14 and coupled at a point A' to an eccentric point of the bar 10 by linkage 17. Point A' is symmetrical to point A relative to the centre of the torsion bar 10. Point B and point B' coincide such that actuator 140 is coupled to frame 2 at point B by linkage 15, which is, for example, an embedded fitting.

The point B belongs to an arm 141 of the actuator 140 arranged along an axis Y6 of direction Y. A motor 142, which is for example similar to the motor 68, is so fixed to the arm 141 that its rotor can rotate about an axis Y9 of direction Y. A first part 143 of a ball screw 144, arranged along the axis Y9, is fixed to the rotor of the motor 142. The first part 143 is able to cause translation along the axis Y9 of a second part 145 of the ball screw 144. The second part 145 is coupled by a pivot linkage 146 of axis X10 of direction X to an arm 147. The arm 147 is arranged along an axis Y7 of direction Y. One end 147a of the arm 147 is coupled to one end 149a of an arm 149 by a pivot linkage 148 of axis X11. The second part 145 is coupled to an arm 163 by the pivot linkage 146. The arm 163 is arranged along the axis Y7. One end 163b of the arm 163 is coupled to one end 151a of an arm 151 by a pivot linkage 150 of axis X12. The end 147b of the arm 147 is coupled to the end 163a of the arm 163, at the pivot linkage 146, in such a manner that the arms 147 and 163 are moveable in rotation one relative to the other about the axis X10.

The arm 149 is arranged along an axis Z11. The opposite end 149b of the arm 149 is coupled by a pivot linkage 152 of axis X13 to one end 153a of an arm 153. The arm 153 is arranged along an axis Y8 of direction Y. An arm 155, including the point A, is coupled to the arm 153 by the pivot linkage 152. In other words, the arm 149 is fixed relative to the arm 155.

The arm 151 is arranged along an axis Z12. The opposite end 151b of the arm 151 is coupled to one end 153b of the arm 153 by a pivot linkage 154 of axis X14. An arm 156, including the point A', is coupled to the arm 153 by the pivot linkage 154. In other words, the arm 151 is fixed relative to the arm 156.

The operation of the actuator 140 will now be described.

When the rotary motor 142 rotates the first part 143 about the axis Y9, the second part 145 of the ball screw 144 performs a translation of axis Y9 relative to the first part 143. The second part 145 applies a force of direction Y to the arm 147 and to the arm 163. The arms 147 and 163 are translated in the direction Y relative to the first part 143 and are inclined one relative to the other about the axis X10. This has the effect that the arm 149 pivots relative to the arm 147 about the axis X11 and relative to the arm 153 about the axis X13. The arm 155 thus performs a vertical movement relative to the arm 141, which allows the distance between the points A and B to be adjusted. In similar manner, the arm 151 pivots relative to the arm 163 about the axis X12 and relative to the arm 153 about the axis X14. The arm 156 thus performs a vertical movement relative to the arm 141, which allows the distance between the points A' and B to be adjusted. It will be noted that an increase in the distance between the points A and B necessarily causes a reduction in the distance between the points A' and B, and vice versa.

Other alternative actuator embodiments are possible.

For example, actuation of the actuators may be effected by a linear motor with direct drive or by a linear electromechanical actuator.

The actuators may be hydraulic. An hydraulic actuator includes two fluid chambers separated by a piston, the piston rod being for example coupled to the bar 10 and the piston casing being coupled to the frame. In this case, the vehicle is provided with an hydraulic pump and valves.

The torsion bar can be of any form whatever. This permits easy implementation of the anti-roll device by passing round the elements of the vehicle, in particular the transmission parts.

In the first embodiment, the actuators are displaced in opposite directions, but not necessarily by the same distance. The actuators may have different characteristics in terms of power, maximum load and response time. For example, one actuator may be an electromechanical actuator with a more rapid response time and a shorter stroke than the second actuator. The system may thus control with the first actuator the rapid small lateral accelerations, which occur regularly, and control the angle of roll with the other actuator for large lateral accelerations.

Although the invention has been described in relation to several particular embodiments, it is quite obvious that it is in no way limited to them and that it includes all technical equivalents of the means described and their combinations if these are within the framework of the invention.

TABLE 1

|  | A | A'/A" | B | B'/B" |
|---|---|---|---|---|
| Case 1 | Pivot X<br>Pivot L<br>No translation L | Pivot X<br>Pivot L<br>Translation L | embedded | embedded |
| Case 2 | Pivot X<br>Pivot L<br>No translation L | Pivot X<br>Pivot L<br>No translation L | embedded | Pivot X |
| Case 3 | Pivot L<br>No translation L | Pivot L<br>Translation L | Pivot X | Pivot X |
| Case 4 | Pivot X<br>Pivot L<br>No translation L | Pivot X<br>Pivot L<br>No translation L | Pivot X | Pivot X |

The invention claimed is:

1. An active anti-roll device of a vehicle, comprising:
   a wheel set including two wheel supports coupled to a frame of the vehicle;
   a torsion bar linked to the frame, said torsion bar including free ends coupled to the wheel supports; and
   at least one actuator having a first zone and a second zone, and the first zone being connected to an eccentric point by an actuator-bar linkage and the eccentric point being relative to a median axis of the vehicle and the torsion bar, and the second zone being connected to the frame by an actuator-frame linkage;
   wherein the at least one actuator presents actuation means to create a relative displacement between the first and the second zones and the at least one actuator being arranged so as to adjust a substantially vertical distance between the eccentric point and the frame as a function of a control signal. and the active anti-roll device further including control means to transmit the control signal to the at least one actuator, and wherein the first zone of the at least one actuator is linked to the second zone of the actuator by a pivot linkage of an axis parallel with a transversal direction of the frame, the first zone being arranged such that the axis of the pivot linkage and the eccentric point of the torsion bar are in a substantially horizontal plane relative to the frame, and the actuator includes a force reduction means coupled to the actuation means, said force reduction means causes pivoting of the first zone relative to the second zone.

2. The active anti-roll device as described in claim 1, wherein the force reduction means includes a screw and a nut and the actuation means being configured to cause rotation of the screw about a longitudinal direction of the frame and the screw being able to drive the nut in translation along the longitudinal axis, the nut and one of the zones of the actuator being fixed one relative to the other, and the screw being linked to the other of the zones of the actuator by a pivot linkage of an axis parallel with a transversal direction of the said frame.

3. The active anti-roll device as described in claim 1, wherein the force reduction means includes a sector of a circle and a worm screw. and the actuation means being able to rotate the worm screw and the worm screw being able to rotate said sector of the circle about the axis of the pivot linkage, said sector of the circle and the first zone being fixed one relative to the other.

4. An active anti-roll device of a vehicle, comprising;
a wheel set including two wheel supports coupled to a frame of the vehicle;
a torsion bar linked to the frame, said torsion bar including free ends coupled to the wheel supports; and
at least one actuator having a first zone and a second zone, and the first zone being connected to an eccentric point by an actuator-bar linkage and the eccentric point being relative to a median axis of the vehicle and the torsion bar, and the second zone being connected to the frame by an actuator-frame linkage;
wherein the at least one actuator presents actuation means to create a relative displacement between the first and the second zones and the at least one actuator being arranged so as to adjust a substantially vertical distance between the eccentric point and the frame as a function of a control signal, and the active anti-roll device further including control means to transmit the control signal to the at least one actuator, and wherein the first zone of an actuator is connected to the second zone of the actuator by a sliding linkage of a slide axis orientated in the vertical direction, the actuator including a force reduction means coupled to the actuation means to cause translation of a vertical direction of the first zone relative to the second zone.

5. The active anti-roll device as described in claim 4, wherein the force reduction means includes a rack and a pinion and the actuation means is configured to rotate the pinion to drive the rack in translation along the slide axis in the vertical direction, the rack and the first zone being fixed relative to the other.

6. The active anti-roll device as described in claim 4, wherein the force reduction means includes a screw and a nut, the actuation means being able to rotate the screw about an axis of a vertical direction, the screw being able to drive the nut in translation along the axis of the vertical direction, the nut and the first zone of the actuator being fixed one relative to the other.

7. An active anti-roll device of a vehicle, comprising:
a wheel set including two wheel supports coupled to a frame of the vehicle;
a torsion bar linked to the frame, said torsion bar including free ends coupled to the wheel supports; and
at least one actuator having a first zone and a second zone, and the first zone being connected to an eccentric point by an actuator-bar linkage and the eccentric point being relative to a median axis of the vehicle and the torsion bar, and the second zone being connected to the frame by an actuator-frame linkage;
wherein the at least one actuator presents actuation means to create a relative displacement between the first and the second zones and the at least one actuator being arranged so as to adjust a substantially vertical distance between the eccentric point and the frame as a function of a control signal, and the active anti-roll device further including control means to transmit the control signal to the at least one actuator, and wherein the at least one actuator comprises a first actuator and a second actuator being connected to the frame and to two eccentric points situated on either side of a centre of the torsion bar, and wherein the first actuator has a more rapid response time than the second actuator.

8. The active anti-roll device as described in claim 7, wherein said control means being configured for transmitting control signals to the first actuator and the second actuator, such that when the first actuator increases the substantially vertical distance between the eccentric point associated with the first actuator and the frame, the second actuator reduces the substantially vertical distance between the eccentric point associated with the second actuator and the frame.

9. The active anti-roll device as described in claim 7, wherein the actuator-bar linkage permits rotation of the first zone of the first actuator and the first zone of the second actuator relative to the torsion bar about a longitudinal direction of the vehicle.

10. The active anti-roll device as described in claim 7, wherein the actuator-bar linkage permits translation of the first zone of the first actuator and the first zone of the second actuator relative to the torsion bar along the axis of the torsion bar.

11. The active anti-roll device as described in claim 7, wherein said at least one actuator includes hydraulic actuation means.

12. The active anti-roll device as described in claim 7, wherein the at least one actuator includes electrical actuation means.

13. The active anti-roll device as described in claim 7, wherein the actuator-bar linkage permits rotation of the first zone of the first actuator and the first zone of the second actuator relative to the torsion bar about an axis of the torsion bar.

14. The active anti-roll device as described in claim 7, wherein the second zone of either the first actuator or the second actuator is fixed relative to the frame.

15. An active anti-roll device of a vehicle, comprising:
a wheel set including two wheel supports coupled to a frame of the vehicle;
a torsion bar linked to the frame, said torsion bar including free ends coupled to the wheel supports; and
at least one actuator having a first zone and a second zone, and the first zone being connected to an eccentric point by an actuator-bar linkage and the eccentric point being relative to a median axis of the vehicle and the torsion bar, and the second zone being connected to the frame by an actuator-frame linkage;
wherein the at least one actuator presents actuation means to create a relative displacement between the first and the second zones and the at least one actuator being arranged so as to adjust a substantially vertical distance between the eccentric point and the frame as a function of a control signal, and the active anti-roll device further including control means to transmit the control signal to the at least one actuator, and wherein the at least one actuator comprises a first actuator and a second actuator being connected to the frame and to two eccentric points situated on either side of a centre of the torsion bar, and wherein the first actuator has shorter stroke than the second actuator.

16. An active anti-roll device of a vehicle, comprising:
a wheel set including two wheel supports coupled to a frame of the vehicle;

a torsion bar linked to the frame, said torsion bar including free ends coupled to the wheel supports;

an actuator in connection with a first actuator-bar linkage and a second actuator bar linkage, said first actuator-bar linkage being disposed on a first side of centre of the torsion bar and said second actuator-linkage being disposed on a second side of centre of the torsion bar, said actuator further including a first zone, wherein the first zone includes a first portion in connection to an eccentric point by the first actuator-bar linkage and a second portion in connection to an eccentric point by the second actuator-bar linkage, and the eccentric points are relative to a median axis of the vehicle and the torsion bar, and the actuator further including a second zone in connection to the frame by an actuator-frame linkage;

a control means being configured further transmitting a control signal to the actuator;

wherein the actuator presents actuation means to create a relative displacement between the first zone and the second zone, and actuator being able to adjust a substantially vertical distance between the eccentric points and the frame, said substantially vertical distance being a function of the control signal; and wherein at least one of said actuator-bar linkages permits translation of the torsion bar relative to the corresponding said first zone of said at least one of the actuator-bar linkages in a transversal direction of the frame, and the actuator further including force reduction means having a screw and a nut, said actuation means being able to rotate the screw about a transversal direction of the frame and the screw being able to drive the nut in translation in the transversal direction, the nut being linked by a pivot linkage having an axis parallel with a longitudinal direction of the frame to a third zone of the actuator, said third zone being linked to the first portion and the second portion of the first zone and when one of the portions of the first zone performs a displacement relative to the frame in a direction of displacement the other of the portions of the first zone performs a displacement relative to the frame in a direction opposite the direction of displacement.

* * * * *

UNITED STATES PATENT AND TRADEMARK OFFICE
CERTIFICATE OF CORRECTION

PATENT NO. : 7,735,837 B2 Page 1 of 1
APPLICATION NO. : 11/650852
DATED : June 15, 2010
INVENTOR(S) : Laurent Barth et al.

It is certified that error appears in the above-identified patent and that said Letters Patent is hereby corrected as shown below:

Column 15/line 16: "further" should read "for";

Signed and Sealed this

Twenty-first Day of September, 2010

David J. Kappos
*Director of the United States Patent and Trademark Office*